US008315607B2

(12) United States Patent
Chen et al.

(10) Patent No.: US 8,315,607 B2
(45) Date of Patent: Nov. 20, 2012

(54) METHOD AND SYSTEM FOR FILTERING INCOMING MESSAGES TO A MOBILE DEVICE

(75) Inventors: Ying-Ju Chen, Taoyuan (TW); John C. Wang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 687 days.

(21) Appl. No.: 12/419,177

(22) Filed: Apr. 6, 2009

(65) Prior Publication Data

US 2010/0255817 A1 Oct. 7, 2010

(51) Int. Cl.
H04M 3/42 (2006.01)
(52) U.S. Cl. .................................. 455/412.2; 455/412.1
(58) Field of Classification Search .................. 700/206; 455/412.1, 412.2, 418, 566
See application file for complete search history.

(56) References Cited

U.S. PATENT DOCUMENTS

| 2003/0224760 | A1 | 12/2003 | Day | |
|---|---|---|---|---|
| 2004/0088359 | A1* | 5/2004 | Simpson | 709/206 |
| 2006/0259543 | A1 | 11/2006 | Tindall | |
| 2008/0109509 | A1* | 5/2008 | Dickerson et al. | 709/201 |
| 2009/0131023 | A1* | 5/2009 | Lorello et al. | 455/412.1 |
| 2009/0209243 | A1* | 8/2009 | Brown et al. | 455/418 |

FOREIGN PATENT DOCUMENTS

EP 1850287 10/2007

OTHER PUBLICATIONS

European Patent Office; European Search Report; European Patent Application No. 09013432.1; Dec. 15, 2009; pp. 1-3.
European Patent Office; Official Communication; European Patent Application No. 09013432.1; Dec. 30, 2009; pp. 1-5.
European Patent Office; Official Communication; European Patent Application No. 09013432.1; Jun. 7, 2011; pp. 1-5.

* cited by examiner

Primary Examiner — Ajit Patel
Assistant Examiner — Myron K Wyche
(74) Attorney, Agent, or Firm — Perkins Coie LLP

(57) ABSTRACT

A system for managing and filtering incoming messages to a mobile device is configured to receive incoming messages using multiple formats, such as e-mail, Short Messaging System (SMS) messages, Multimedia Message System (MMS) messages, or other electronic messaging formats. One or more message filters are used to consolidate and display high importance messages by the device in a single location. The message filters may be configured to select incoming messages based on factors such as the identity of the sender and the destination account. After receiving a new message, the system compares characteristics of the incoming message to the key characteristics defined by one or more of the filters. If an incoming message matches one of the filters, the system adds the matching message to a list of high importance messages. The system provides a separate user interface to display the high importance messages.

32 Claims, 11 Drawing Sheets

METHOD AND SYSTEM FOR FILTERING INCOMING MESSAGES TO A MOBILE DEVICE

BACKGROUND

As mobile technology improves, mobile devices have become smaller and more powerful. The wireless networks they connect to have improved, as well. With these improvements mobile devices can now connect to networks for many functions beyond simple voice calling. For example, they can be used to send e-mail, browse the Internet, and send instant messages. Many devices also include a global positioning system (GPS) receiver with integrated mapping (or maps downloaded from a network). In some cases, the mobile devices support wireless standards providing local connectivity, such as Bluetooth or IEEE802.11. These standards can enable the devices to connect to a wireless local area network (WLAN) or even communicate with other mobile devices in a peer-to-peer mode. However, as these various connectivity options grow, incoming information can quickly become overwhelming for a mobile device user. Therefore, as technology improves, it would be useful to have applications that are better able to organize data for a mobile user.

DETAILED DESCRIPTION

A system for managing and filtering incoming messages to a mobile device is disclosed (hereinafter referred to as the "message filtering system" or the "system"). The mobile device may be configured to receive incoming messages using multiple formats, including e-mail, Short Messaging System ("SMS") messages, Multimedia Message System ("MMS") messages, or other electronic messaging formats. The mobile device may also be configured with one or more accounts for receiving messages. The system uses one or more message filters to consolidate and display in a single location high importance messages received through these multiple accounts. The message filters may be configured to select incoming messages based on factors such as the identity of the sender and the destination account. After receiving a new message, the system compares characteristics of the incoming message to the key characteristics defined by one or more of the filters. If an incoming message matches one of the filters, the system adds the matching message to a list of high importance messages. The system then provides a separate user interface to display the high importance messages.

The system provides multiple methods to define new message filters. A user may directly define a filter using text input. A filter may also be defined based on a contact stored in an address book on the mobile device (e.g., in Microsoft Outlook) or a server-based address book (e.g., Microsoft Exchange). A user may also add a new filter by selecting a received message in the user's inbox. The system may then create a filter using only the message sender or using all addresses included in the message.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, in order to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Figure 1:
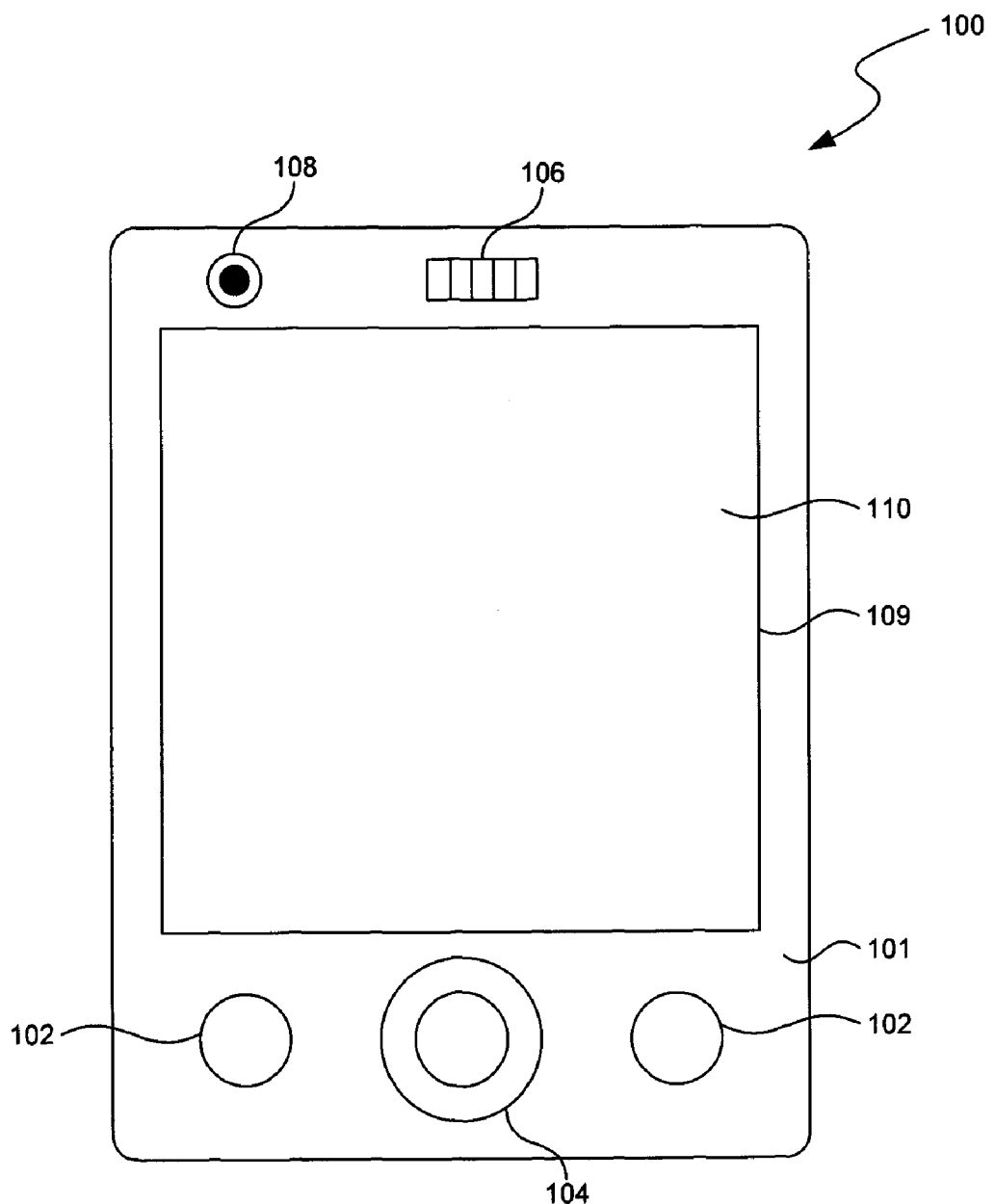
FIG. 1 is a front view of a mobile device suitable for implementing an message filtering system.

FIG. 1 is a front view of a mobile device 100 suitable for implementing a message filtering system. As shown in FIG. 1, the mobile device 100 can include a housing 101, a plurality of push buttons 102, a directional keypad 104 (e.g., a five-way key), a speaker 106, a camera 108, and a display 110 carried by the housing 101. The mobile device 100 can also include microphones, transceivers, photo sensors, and/or other computing components generally found in PDA devices, cellular phones, laptop computers, tablet PCs, smart phones, handheld e-mail devices, or other mobile communication/computing devices.

The display 110 can include a liquid-crystal display (LCD), a plasma display, a vacuum fluorescent display, a light-emitting diode (LED) display, a field emission display, and/or other suitable types of display configured to present a user interface. The mobile device 100 can also include a touch sensing component 109 configured to receive input from a user. For example, the touch sensing component 109 can include a resistive, capacitive, infrared, surface acoustic wave (SAW), and/or other types of touch screen. The touch sensing component 109 can be integrated with the display 110 or can be independent from the display 110. In the illustrated embodiment, the touch sensing component 109 and the display 110 have generally similarly sized access areas. In other embodiments, the touch sensing component 109 and the display 110 can have differently sized access areas. For example, the touch sensing component 109 can have an access area that extends beyond a boundary of the display 110.

The mobile device 100 can also include a camera 108 suitable for taking pictures or recording video. The camera 108 includes an optical image sensor and a lens and may also have a flash associated with it for taking pictures in low-light conditions. Although the camera component 108 is shown on the front face of the mobile device 100, the camera component 108 could also be located on the rear face of the device. Alternatively, the mobile device 100 might be configured with multiple cameras, such as with a first camera on the front face and a second camera on the back face.

Figure 2:
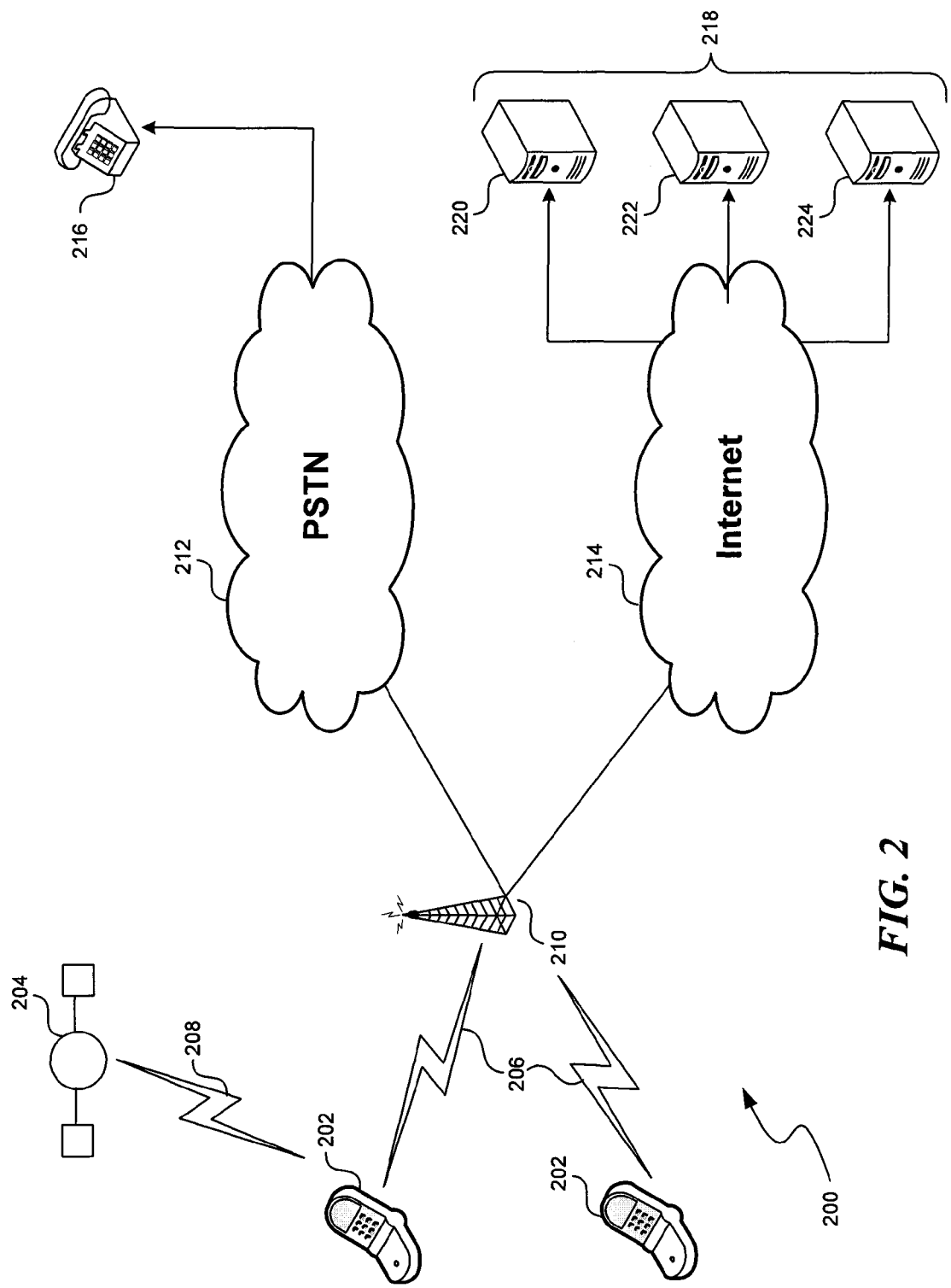
FIG. 2 is a network diagram of a representative environment in which the message filtering system operates.

FIG. 2 is a network diagram of a representative environment 200 in which the message filtering system operates. A plurality of mobile devices 202 roam in an area covered by a wireless network. The mobile devices are, for example, cellular phones or mobile Internet devices, such as the mobile device 100 shown in FIG. 1. The mobile devices 202 communicate to a cellular transceiver 210 through a wireless connection 206. The wireless connection 206 could be implemented using any system for transmitting digital data. For example, the connection could use a cellular network implementing UMTS or CDMA2000 or a non-cellular network implementing WiFi (IEEE 802.11) or Bluetooth. Although wireless connections are most common for these mobile devices, the devices may also communicate using a wired connection such as Ethernet.

In some configurations, the mobile devices 202 also have a Global Positioning System (GPS) receiver embedded in it to provide location information. In these configurations, the mobile devices 202 also receive a location signal 208 from one or more GPS satellites 204. For clarity, the figure only shows one satellite. However, a GPS receiver generally requires several satellites in order to determine its location. Alternatively or additionally, the cellular transceiver 210 may, with assistance from the mobile devices 202, employ known signal triangulation and/or signal delay techniques to determine the location of each wireless device.

The cellular transceiver 210 is connected to one or more networks that provide backhaul service for the wireless network. The cellular transceiver 210 is connected to a Public-Switched Telephone Network ("PSTN") 212, which provides a connection between the mobile network and a remote telephone 216 on another network. When the user of the mobile device 202 makes a voice telephone call, the cellular transceiver 210 routes the call through the wireless network's voice backhaul (not shown) to the PSTN 212. The PSTN 212 then automatically connects the call to the remote telephone 216. If the remote telephone 216 is another mobile device, the call is routed through a second wireless network's backhaul to another cellular transceiver.

The cellular transceiver 210 is also connected to the Internet 214, which provides a packet-based connection to remote devices 218 supporting network applications. When the user of the mobile device 202 communicates through a data connection, the cellular transceiver routes the packet data through the wireless network's data backhaul (not shown) to the Internet 214 (or another packet-based network). The Internet connects the wireless network to remote devices 218, including an e-mail server 220, a web server 222, and an instant messenger server 224. Of course, the remote devices 218 could include any application available over the Internet, such as a file transfer protocol (FTP) server or a streaming media server.

Figure 3:
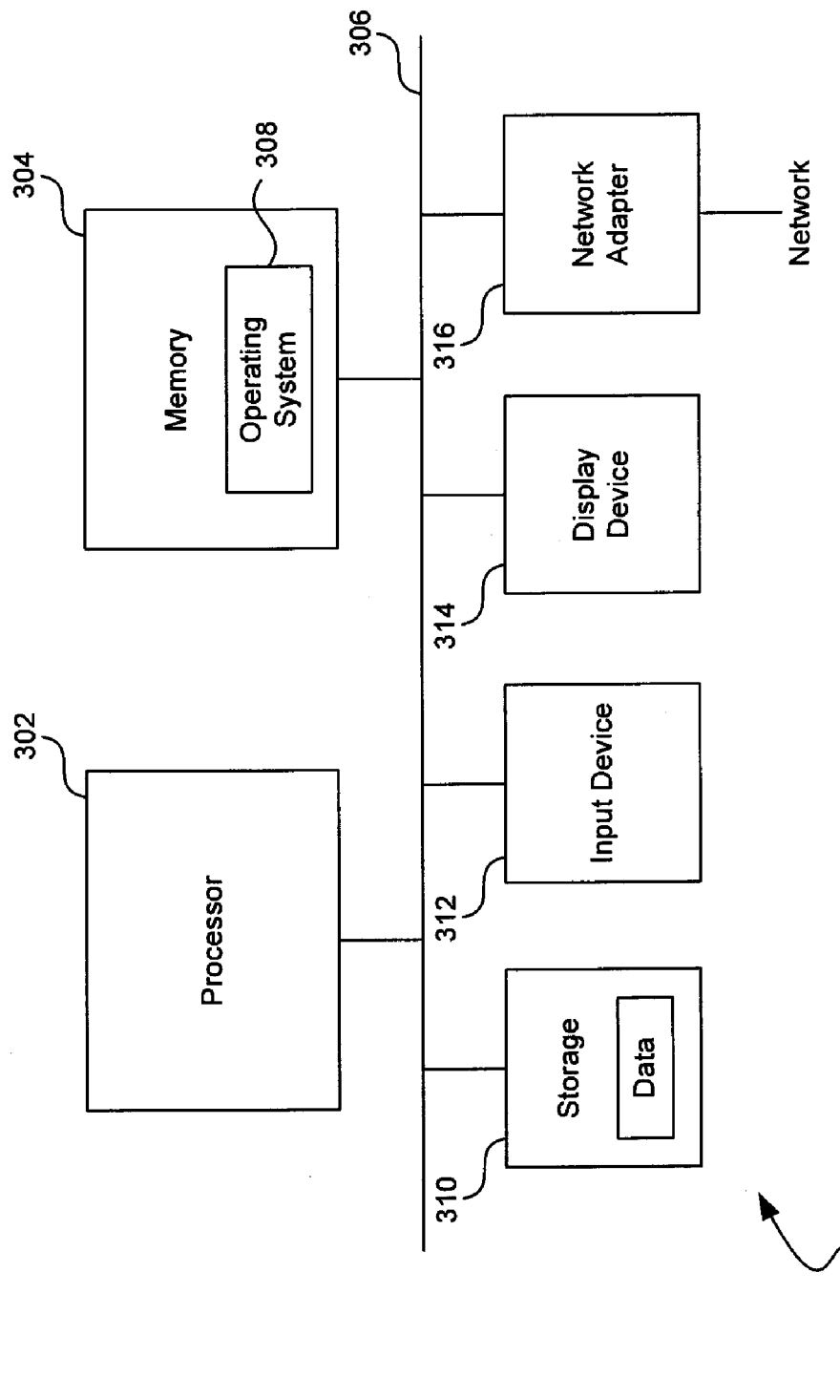
FIG. 3 is a high-level block diagram showing an example of the architecture of a mobile device.

FIG. 3 is a high-level block diagram showing an example of the architecture of a mobile device 300. The mobile device 300 may represent the mobile devices 202 of FIG. 2.

The mobile device 300 includes one or more processors 302 and memory 304 coupled to an interconnect 306. The interconnect 306 shown in FIG. 3 is an abstraction that represents any one or more separate physical buses, point-to-point connections, or both connected by appropriate bridges, adapters, or controllers. The interconnect 306, therefore, may include, for example, a system bus, a Peripheral Component Interconnect (PCI) family bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire."

The processor(s) 302 may include central processing units (CPUs) of the mobile device 300 and, thus, control the overall operation of the mobile device 300. In certain embodiments, the processor(s) 302 accomplish this by executing software or firmware stored in memory 304. The processor(s) 302 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 304 is or includes the main memory of the mobile device 300. The memory 304 represents any form of fixed or removable random access memory (RAM), read-only memory (ROM), flash memory, or the like, or a combination of such devices. In use, the memory 304 stores, among other things, the operating system 308 of the mobile device 300.

The mobile device 300 includes an input device 312, which enables a user to control the device. The input device 312 may include a keyboard, trackpad, touch sensitive screen (e.g., the touch sensing component 109 of FIG. 1), or other standard computer input device. The mobile device 300 also includes a display device 314 suitable for displaying a user interface, such as the display 110 (FIG. 1). The network adapter 314 provides the mobile device 300 with the ability to communicate with remote devices over a network and may be, for example, a wireless adapter. The mobile device 300 may further include local storage 310 coupled to the interconnect 306. The local storage 310 may include, for example, a flash memory device configured to provide mass storage.

Figure 4A:
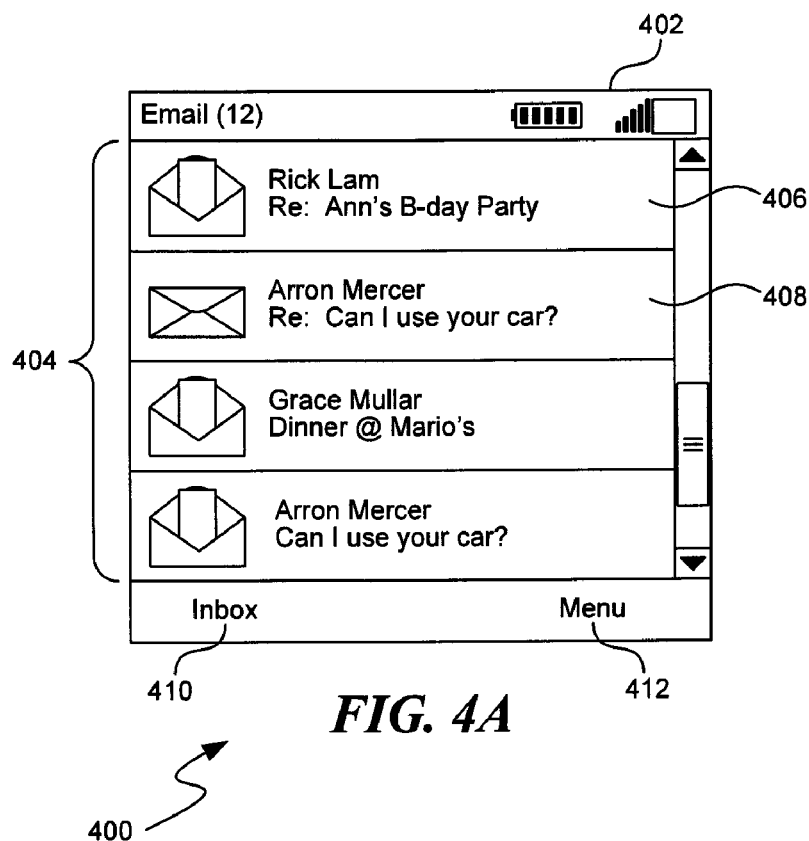
FIG. 4A shows an example interface in which a message display screen is displayed.

FIGS. 4A through 4E illustrate screens of an example interface suitable for use by the message filtering system. FIG. 4A shows an example interface 400 in which a message display screen is displayed. The interface 400 displays some or all of the high importance messages detected by the message filtering system. The interface 400 includes an information bar 402, which indicates the name of the program and the number of high importance messages in the message list. The interface 400 also includes a message display window 404, which displays multiple messages, including messages 406 and 408. The interface 400 includes visual cues (e.g., bold text, icons) to indicate that message 406 has been read while message 408 is unread. The interface 400 also includes an Inbox soft key 410 and a Menu soft key 412, which enable the user to access the software menus that control the system.

Figure 4B:
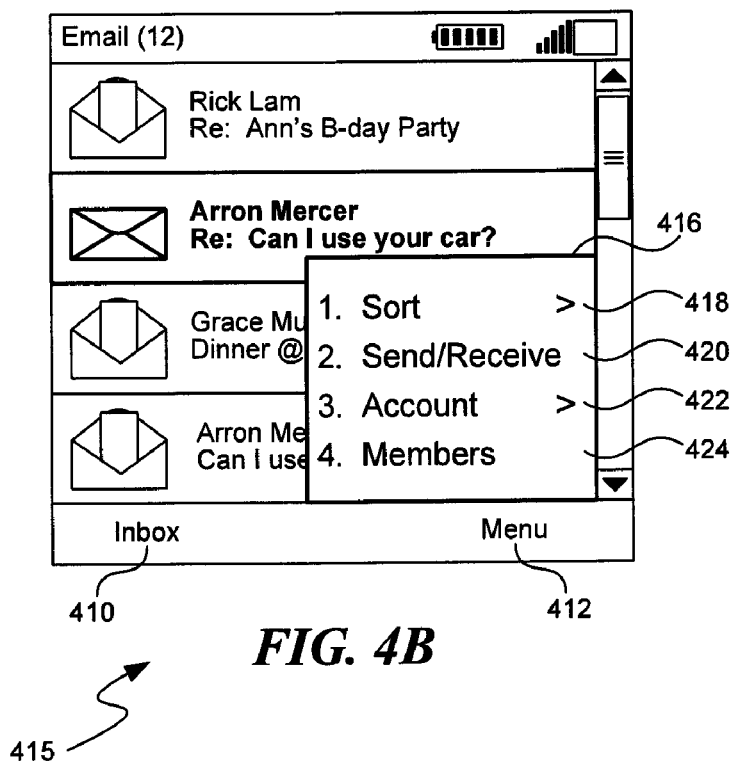
FIG. 4B shows an example interface including a control menu displayed in response to the user selecting a menu key.

FIG. 4B shows an example interface 415, which includes a control menu 416 displayed in response to the user selecting the menu key 412. The menu 416 provides functions that control the display and behavior of the system. In particular, the menu 416 includes a sort function 418, a send/receive function 420, an account function 422, and a members function 424. The send/receive function 420 allows the user to make the mobile device connect to network servers to send and receive messages. The other functions in the menu 416 are discussed below with reference to FIGS. 4C, 4D, and 4E.

Figure 4C:
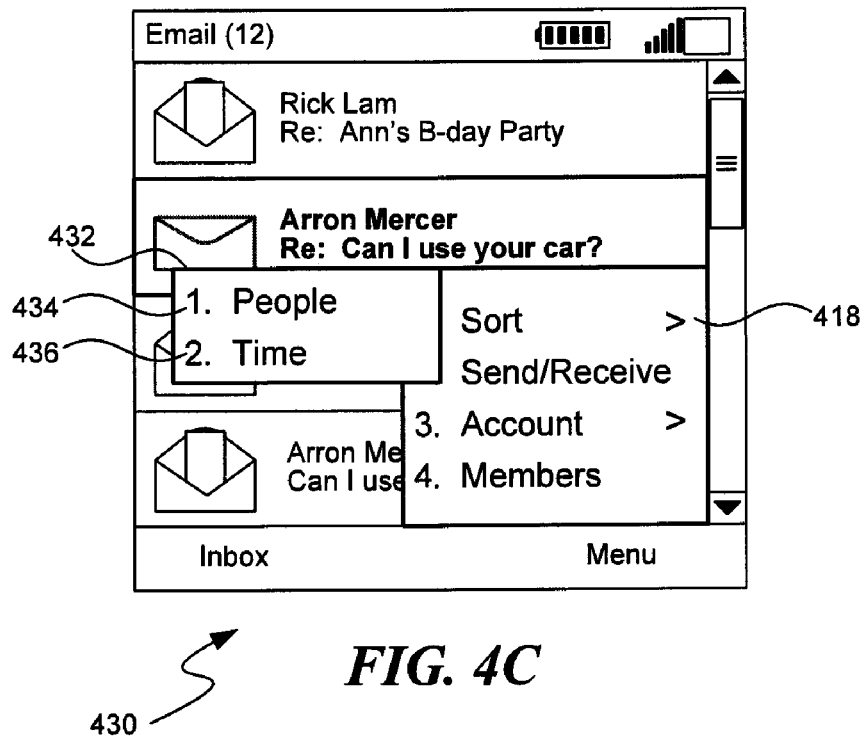
FIG. 4C shows an example interface displayed in response to the user selecting a sort function.

FIG. 4C shows an example interface 430 in which the user has selected the sort function 418 from the control menu 416. After the user selects the sort function 418, the system displays a sort submenu 432, which provides options for sorting the displayed messages. In particular, the sort submenu 432 provides a sort-by-people function 434 and a sort-by-time function 436. The sort-by-people function 434 directs the system to sort the message list using the name of the message senders. The sort order may be, for example, alphabetical by first name or alphabetical by last name. The sort-by-time function 436 directs the system to sort the message list according to the time associated with each message. The sort time may be determined based on, for example, each message's receive time or send time.

Figure 4D:
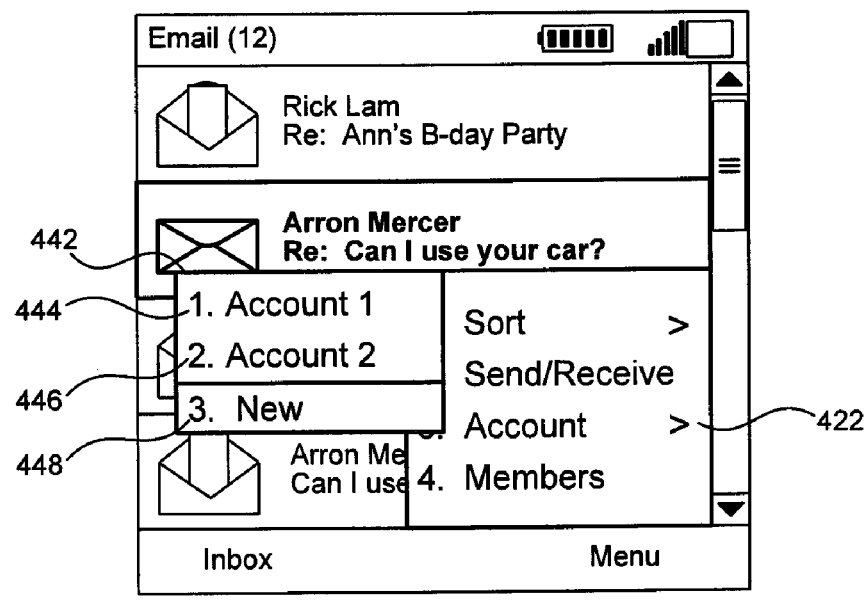
FIG. 4D shows an example interface displayed in response to the user selecting an account function.

FIG. 4D shows an example interface 440 in which the user has selected the account function 422 from the control menu 416. After the user selects the account function 422, the system displays an account submenu 442, which allows the user to select and manage the messaging accounts that are being used to receive messages. In particular, the user can select one of the existing accounts 444 and 446 to display and configure the options associated with an account. The system may also allow a user to filter messages to display only messages sent to a selected account. A user may also select the new function 448 to define a new messaging account to be tracked by the system.

Figure 4E:
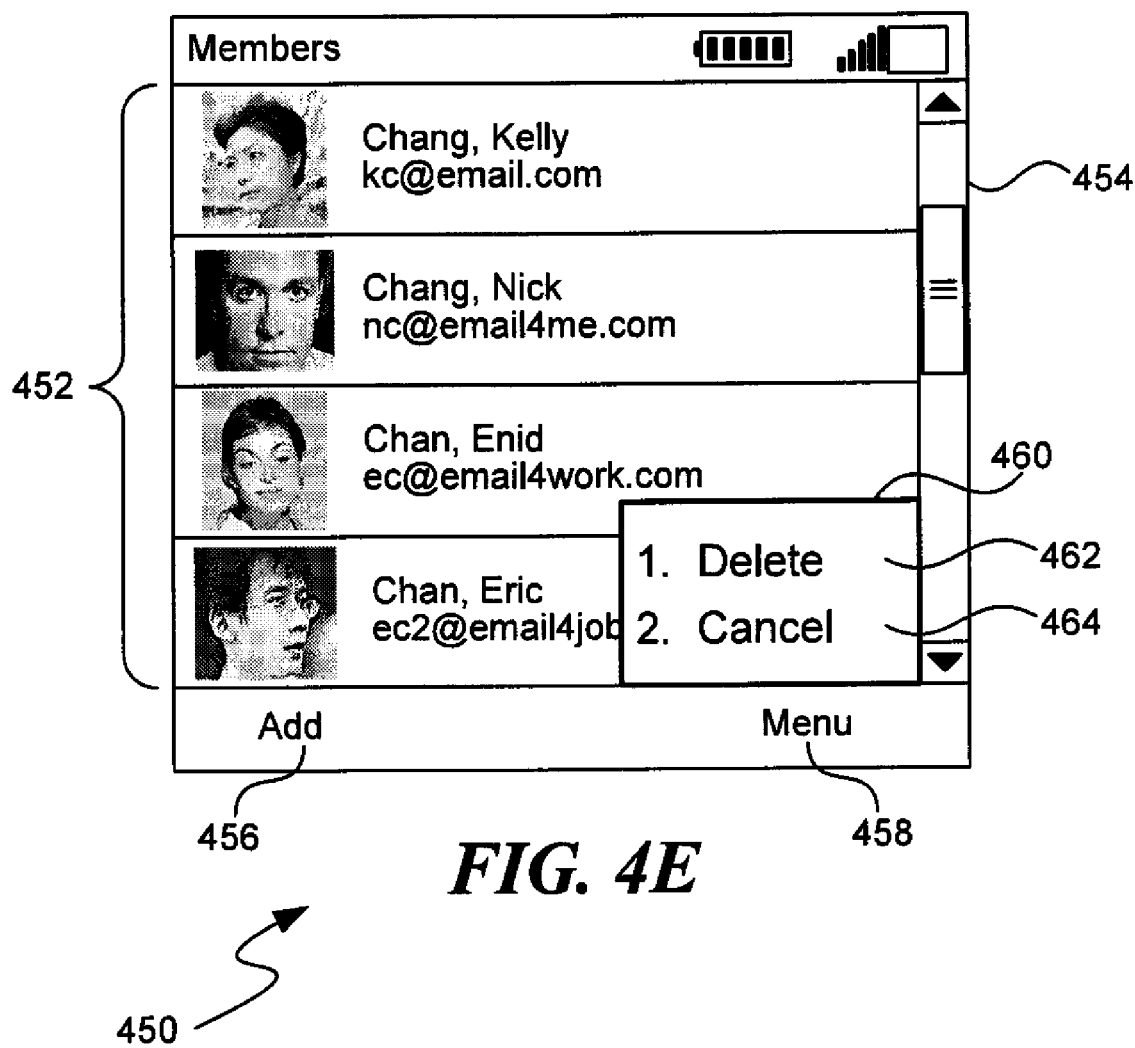
FIG. 4E shows an example interface for managing contacts tracked by the message filtering system.

FIG. 4E shows an example interface 450 for managing contacts tracked by the system. The interface 450 may be displayed, for example, in response to a user selecting the members function 424 provided by the control menu 416. The interface 450 includes a contact list 452, which displays a name and network address for each contact 454. The interface 450 allows the user to manage contacts by adding, editing, or deleting individual contacts. For example, the system may be configured to display an edit page for a selected contact, which may be used to edit the information associated with the contact. The interface 450 also includes an Add soft key 456, which enables a user to add a new contact to the list. Adding a contact may include, for example, displaying a dialog to receive from the user a name and sender address associated with the new contact. The interface 450 also includes a Menu soft key 458, which displays a menu 460 when it is pressed. The menu 460 includes a delete function 462, which enables the user to delete a selected contact. The menu 460 also includes a cancel function 464, which allows the user to exit the contact management interface 450.

Figure 5:
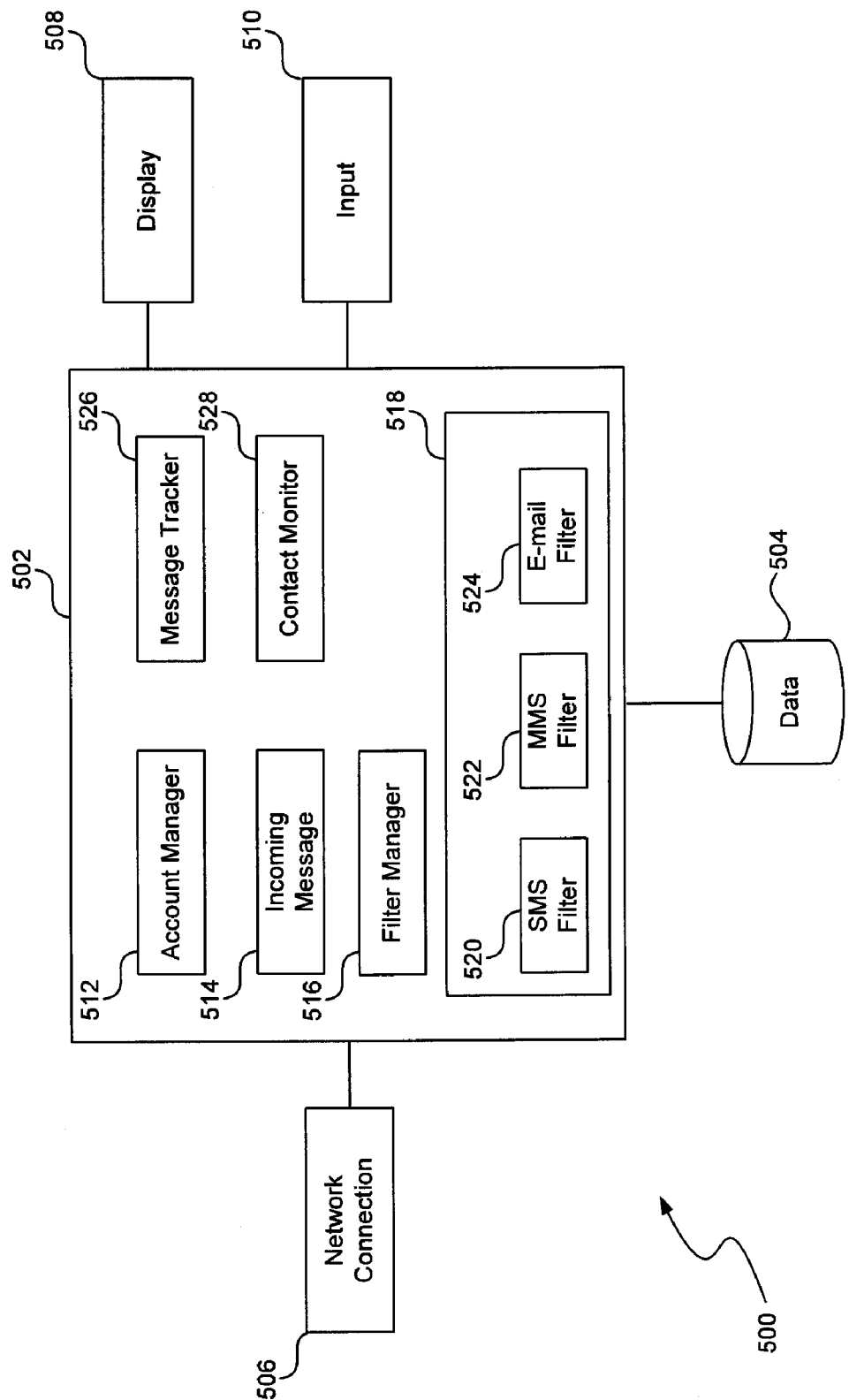
FIG. 5 is a logical block diagram of the message filtering system.

FIG. 5 is a logical block diagram of a message filtering system 500. The system 500 may be executed, for example, using the memory and processor of FIG. 3. Although the various modules are depicted in a single device, the modules are not necessarily physically collocated. In some embodiments, the various modules may be distributed over multiple physical devices. Similarly, the data storage could be implemented using local storage components, such as a hard drive or flash memory, or using remote storage, such as a web server accessible through the Internet. The code to support the functionality of this system may be stored on a computer readable medium such as an optical drive, flash memory, or a hard drive. Aspects of the system 500 may be implemented as software, firmware, hardware, or as a combination of these.

The system 500 includes a processing component 502, which is configured to manage and filter messages received by the system. The processing component 502 is connected to a data storage component 504, which stores messages, message filter definitions, and other settings data processed by the system. The processing component 502 is also connected to a network connection component 506, which provides a data connection to a mobile wireless network.

The processing component 502 is also connected to an input component 510 that is configured to receive user input through an input device, such as a touch sensitive screen or a keyboard. The input device may also include a dedicated hardware button configured to activate or control the message filtering process. The processing component also connects to a display component 508, which is configured to control the screen of the mobile device as directed by the processing component 502.

The processing component 502 includes an account manager component 512, which is configured to manage messaging accounts (e.g., e-mail, SMS, MMS, etc.) tracked by the system. During operation, the account manager component 512 receives account information through the input component 510 to specify which accounts will be tracked by the system. The account manager component 512 interacts with the data storage component 504 to persistently store the account information.

The processing component 502 also includes an incoming message component 514, which is configured to receive and process messages incoming to the mobile device. In some configurations, the incoming message component 514 is configured to receive new message notifications from one or more messaging applications present on the mobile device. In response to the notification, the incoming message component 514 may then receive a copy of the new message or a pointer to the memory location where the new message is stored. If the incoming message component 514 receives a copy of the new message, it may store its copy using the data storage component 504. Alternatively, the incoming message component 514 may be configured to retrieve messages from a message store in response to a command activating the message filtering system, such as when a user presses a dedicated hardware button.

The processing component 502 includes a filter manager component 516, which is configured to create, store, edit, and delete message filters defined by the message filtering system. In particular, the filter manager component 516 creates new message filters from data provided by the user according to the process described below with respect to FIG. 7. The filters define the parameters associated with incoming messages that indicate if the message is of high importance. The parameters may include, for example, the sender's address or name. The filter manager component 516 also modifies and deletes filters based on user input.

The processing component 502 also includes a filtering component 518, which is configured to apply a message filter to an incoming message to determine if the incoming message is a high importance message. The filtering component 518 includes multiple submodules that may be used based on the type of message being filtered. For example, the filtering component 518 includes an SMS filter component 520, an MMS filter component 522, and an e-mail filter component 524, which process incoming messages of each respective type. During operation, the filtering component 518 receives the message filters defined by the filter manager component 516. After receiving a new message from the incoming message component 514, the filtering component 518 provides the message to the appropriate submodule for filtering. The submodules compare data in the message to the active filters and mark as high importance messages that match the parameters defined for the filter. The filtering component 518 may also include filtering submodules suitable for handling additional types of messaging on the mobile device.

The processing component 502 includes a message tracker component 526, which is configured to maintain a list of messages that have been marked as high importance by the filtering component 518. The message tracker component 526 is also configured to control the display component 508 to display some or all of the flagged messages on the mobile device's display. The message tracker component 526 may also be configured to track message status, such as whether the message is read or unread. In doing this, the message tracker component 526 may communicate with other applications on the mobile device (e.g., the e-mail application) to determine a message's status. The message tracker component 526 may also maintain metadata about individual messages, such as time received and the filter(s) that matched the message.

The processing component also includes a contact monitor component 528, which is configured to monitor the status of address book contacts that have been used to create a filter. For example, a mobile device may have an address book listing multiple contacts, each contact having one or more associated addresses. As discussed below, the system may generate one or more filters based on the address information stored for a contact in the address book. The system uses the contact monitor component 528 to monitor these contacts for changes. As described below with reference to FIG. 9, the system may be configured to modify or remove one or more of the message filters if the associated contact information changes. If a filter is modified or deleted, the system may be configured to repeat the process of filtering messages to generate a new list of high importance messages that is consistent with the change to the filters. Alternatively, the system may be configured to track messages associated with individual filters. If a filter is modified or removed, the system may then modify the message list to remove messages associated with the modified or removed filter. The message tracker component 526 may then control the display component 508 to display the modified list. Although the messages are removed from the message list based on the change to the filters, the messages are still accessible on the mobile device using a standard e-mail or SMS reader. That is, the messages are removed from the high importance list but are not deleted. This allows a user in a hurry to ignore messages associated with a contact that was removed from the address book but to access the messages at a later time. This process also saves the user from having to manually remove messages previously received from the removed contact.

Figure 6:
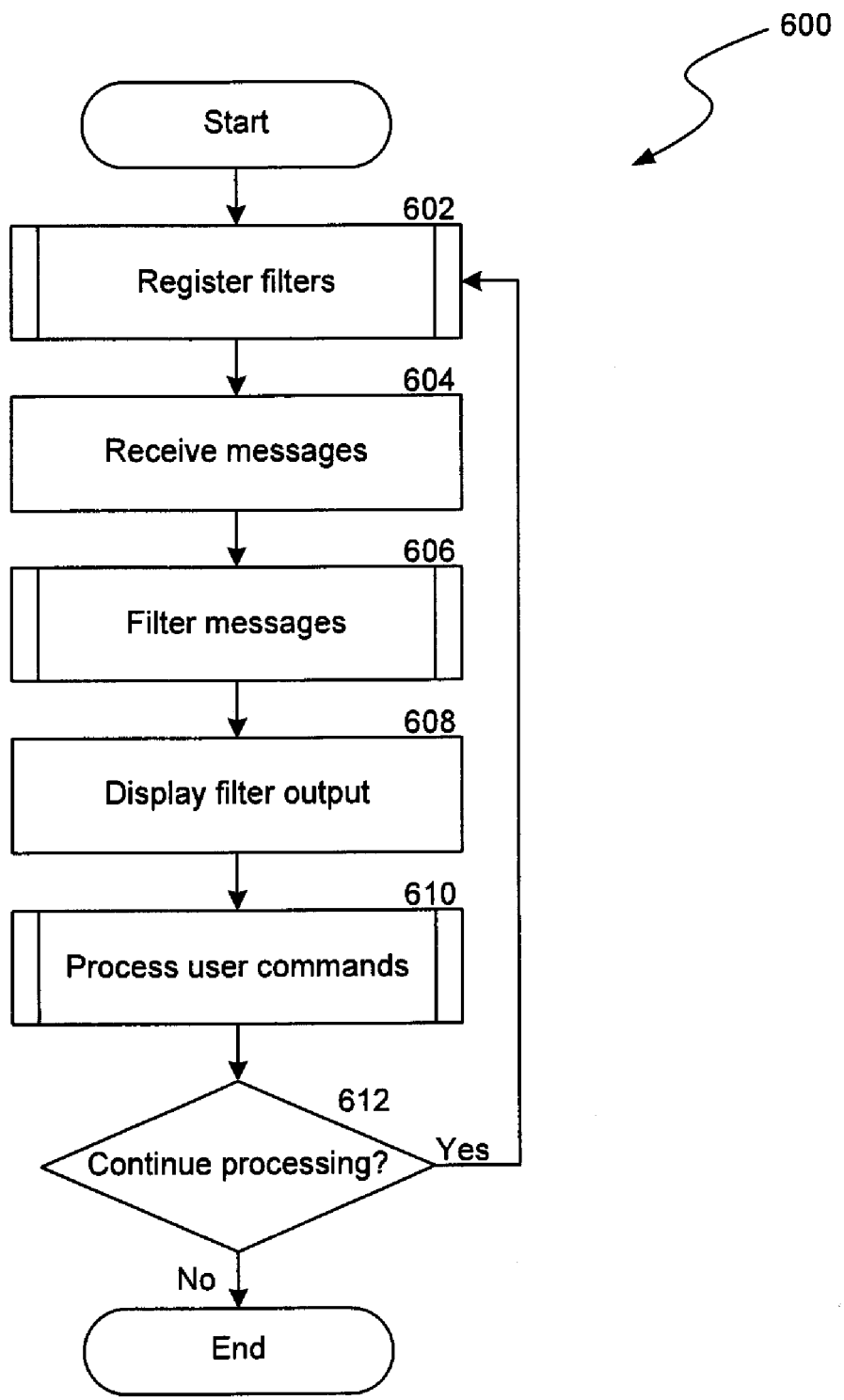
FIG. 6 is a flowchart of an overall process for executing the message filtering system.

FIG. 6 is a flowchart of an overall process 600 for executing the message filtering system. The process begins at block 602, where the system registers one or more message filters. Registering filters includes receiving information from the user that defines the filters to be created and the process of creating and storing the filters. The process is discussed in greater detail below with reference to FIG. 7.

After the filters have been registered, the system may be activated to filter messages using a dedicated hardware button, a configurable soft key, or by launching an application through the mobile device's operating system. In response to the activation command, the system proceeds to block 604, where it receives new messages. As discussed above, the new messages are received using the incoming message component 514, which may receive notifications from other applications on the mobile device, such as an e-mail application or an SMS application. Alternatively, the incoming message component 514 may be configured to receive messages directly (e.g., by connecting directly to an e-mail server or directly receiving SMS message traffic). The incoming message component 514 may also be configured to retrieve message from a local message store on the device.

After receiving new messages, processing proceeds to block 606, where the system filters the received messages. As discussed above, filtering includes comparing data associated with the received messages to the filtering parameters defined for each of the filters that were registered in block 602. The filtering process is discussed in detail below with reference to FIG. 8. During the filtering process in block 606, the filtering component 518 notifies the message tracker component 526 when a high importance message is detected. The message tracker component 526 then adds the new message to its listing of high importance messages. Processing then proceeds to block 608, where the system displays the filter output. In this step, the message tracker component 526 controls the display component 508 to display some or all of the high importance messages. In some configurations, the system displays all high importance messages in a single user interface, such as the interface 400 shown in FIG. 4A. Alternatively, the system may provide multiple interfaces to enable the user to display high importance messages separately based on the account that received the messages. The system may also enable the user to switch between a single account interface and a multiple account interface.

After displaying the filter output, processing proceeds to block 610, where the system processes user commands. The user commands may include, for example, the sort and account display commands discussed above with reference to FIGS. 4A-4E. The system then proceeds to decision block 612, where it determines whether to continue processing. The system may, for example, determine whether the user has entered an exit command or given some other indication that the system should shut down. If the system determines that processing should continue, processing returns to block 602 to configure new filters. If an exit command was received, the process ends.

Figure 7:
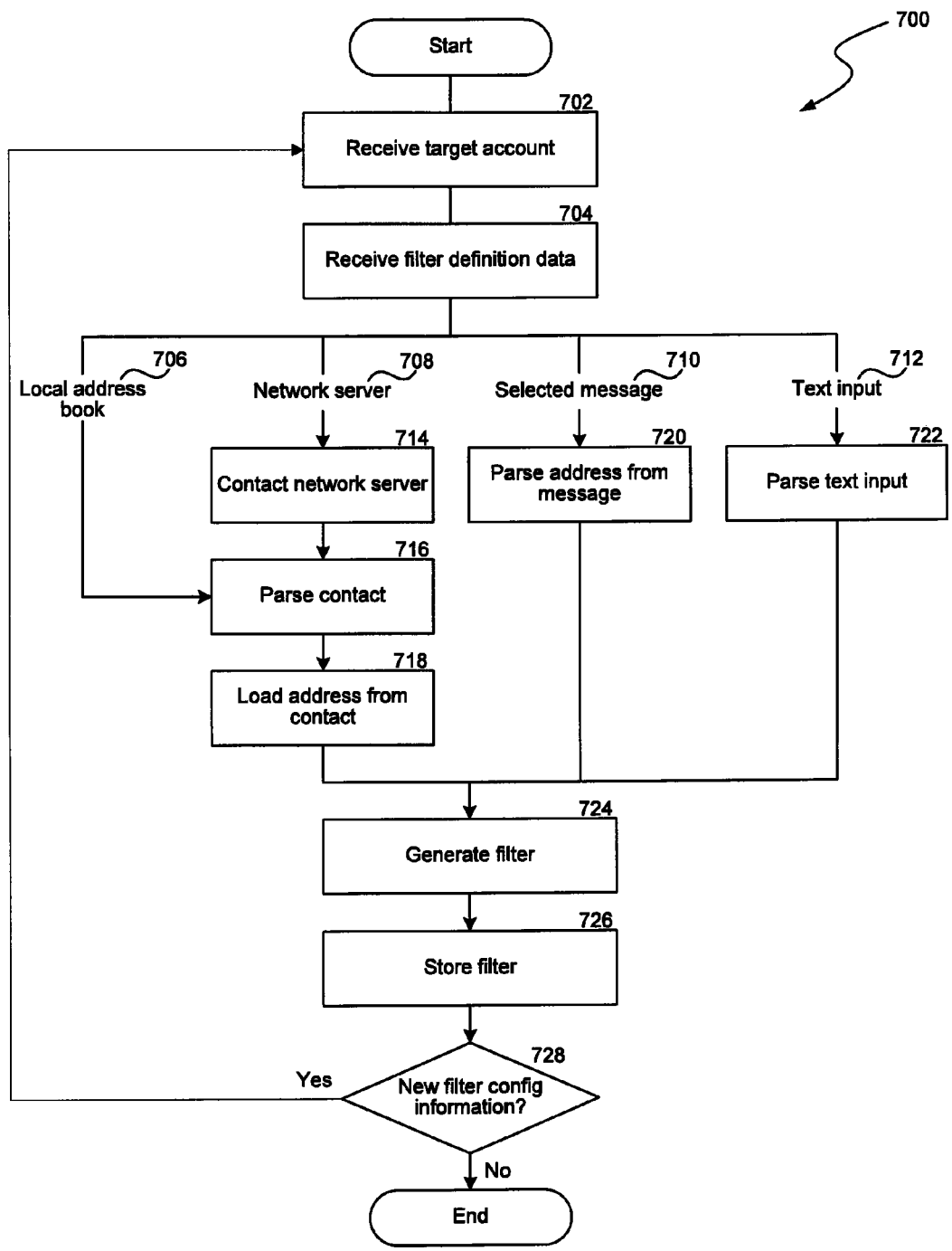
FIG. 7 is a flowchart of a process for creating and configuring a new filter.

FIG. 7 is a flowchart of a process 700 for creating and configuring a new filter. Processing begins in block 702, where the system receives a target messaging account. The target account may be, for example, an e-mail account selected from one or more accounts configured on the device. However, in some configurations, the system is configured to create filters that flag messages received from a particular sender regardless of the receiving account.

After receiving the target account, processing proceeds to block 704, where the system receives the filter definition data. The filter definition data may be one of various types of data objects that the system can use as a source for the parameters to define a new filter. The filter definition data may include multiple components, such as a target message sender. As discussed above, the system provides multiple means for adding a new filter to the system. These methods include using a contact from a local address book or a network server, using addresses from a selected message, or receiving direct text input from the user. Thus, the filter definition data may be the address book contact, selected message, text input, or some other source for defining the message filter. The system may also be configured to receive multiple selections simultaneously, such as if a user selects multiple contacts on a touch sensitive screen. In this configuration, the system may perform the following steps serially or in parallel to add the new filter(s). After receiving the filter definition data at block 704, the system branches depending on the type of target that was received.

In branches 706 and 708, the system determines that the filter definition data is an address book contact. In branch 706, the user contact is located in a local address book stored on the mobile device. In branch 708, the address book contact is stored on a network server, such as the Microsoft Exchange Server provided by Microsoft Corporation of Redmond, Wash. If the filter definition data is a contact stored in a network server address book, the system proceeds to block 714, where it contacts the network server to obtain the contact information. After the address book contact information is obtained from the network server, the system proceeds to block 716, where it parses the contact information. Similarly, if the filter definition data was a contact stored in a local address book, the system proceeds directly to block 716 to parse the selected contact. After parsing the selected contact, the system proceeds to block 718, where it loads any suitable addresses found in the address book contact. Suitable addresses may include, for example, an e-mail address or a mobile telephone number.

If the filter definition data is generated from a selected message, the system proceeds to branch 710 to determine the filter information based on the selected message. After receiving the selected message (in block 704), the system proceeds to block 720, where it parses any addresses from the selected message. The system may use some or all of the addresses in the selected message to define the filter parameters. For example, the system may be configured to use only the sender's address or to use every address from the selected message. In some configurations, the system provides an interface to enable the user to select some or all of these addresses. Alternatively, the system may automatically include the sender's address while providing the user the option to include additional addresses in the message.

As discussed above, a user may also be able to create a filter based on text input. In this case, the system proceeds to branch 712 to generate the filter information using the provided text string. After receiving the text input (in block 704), the system proceeds to block 722, where it parses the text input. This process includes extracting parameter information, such as address information, from the text input.

After the parameters of the filter have been extracted from the filter definition data, processing proceeds to block 724, where the system generates the filter. Generating the filter may include creating a storage object in the memory and providing the parameters that were extracted from the filter target (i.e., in blocks 714-722). For example, the filter may include a high importance message sender parameter that will determine a message is high importance when the message sender is identical to the target message sender that was provided in the filter definition data. The system then proceeds to block 726, where it stores the filter in the data storage component 504. After the filter has been generated and stored, the system proceeds to decision block 728, where it determines whether new filter configuration information has been provided. If additional filter configuration information is provided, the system returns to block 702 to create another filter based on the new filter configuration information. If new filter configuration information is not provided, the process exits.

In some of the branches discussed above, the filter target may provide multiple target sender addresses to be used in a filter (e.g., from a selected e-mail address). In some configurations, the system creates a single filter containing all of the selected addresses. The system may be configured to do this, for example, when creating a filter based on an address book contact, because all of the addresses are assumed to be associated with a single individual. Alternatively, the system may generate multiple filters from a single object. The system might elect to do so in response to receiving a filter target with a selected e-mail message, where the addresses are assumed to be associated with different people. In this configuration, the system in block 724 generates a separate filter for each address instead of a single filter.

Figure 8:
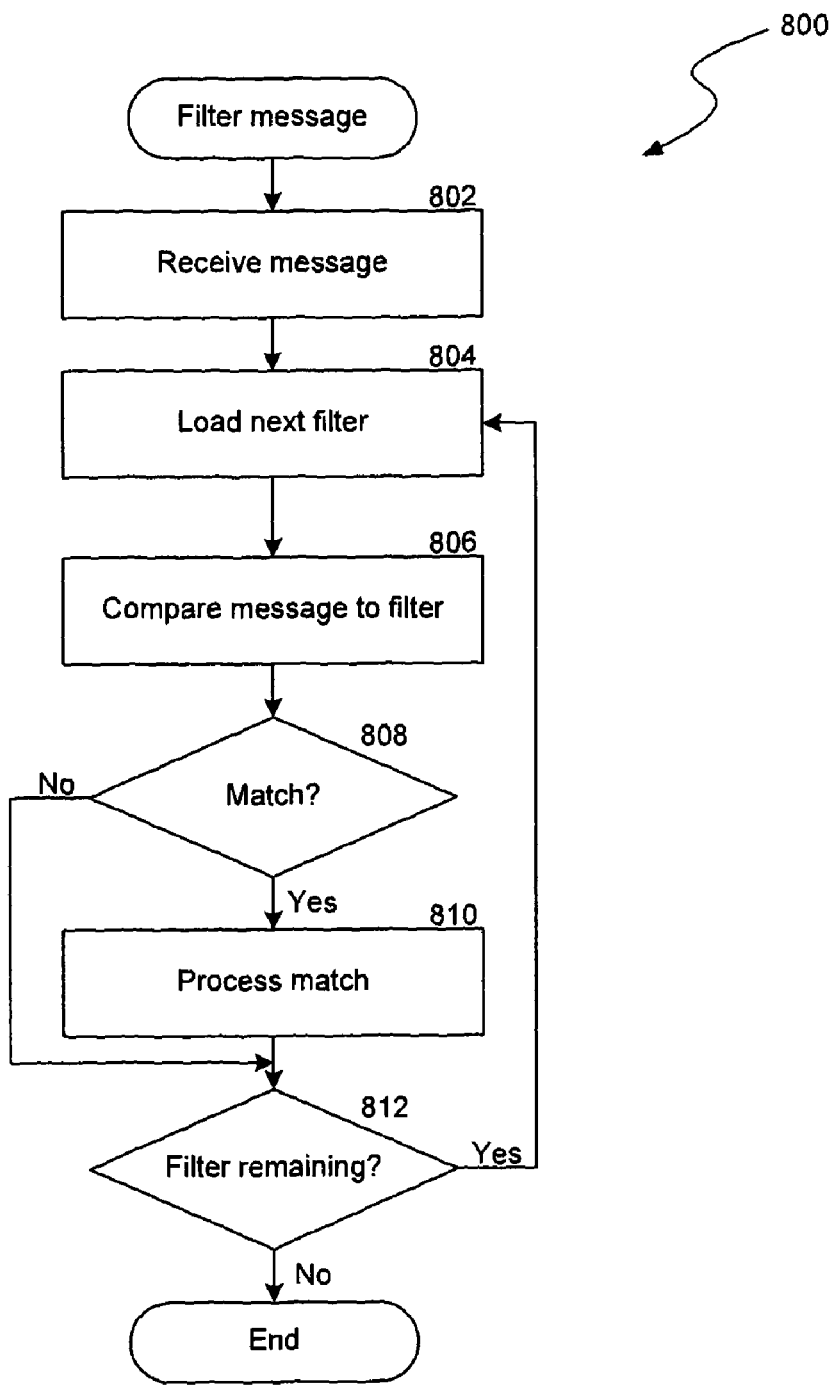
FIG. 8 is a flowchart of a process for filtering received messages using the stored message filters.

FIG. 8 is a flowchart of a process 800 for filtering received messages using the stored message filters. Processing begins in block 802, where the system receives the message to be processed. The system then executes a processing loop to compare the received message against each of the filters stored by the system. This processing loop begins in block 804, where the system loads the next filter. During the first iteration of the processing loop, the system loads the first filter in the stored filter list. After loading the filter, the system proceeds to block 806, where it compares characteristic data of the message to the parameters defined for the currently loaded filter. The characteristic data may include, for example, the destination account and the sender's identity. The characteristic data may include other information, as well, such as the time the message was sent. Thus, comparing characteristic data may include, for example, comparing the message sender's address to an address or set of addresses defined in the filter. If other parameters are defined for the filter, the system also compares the corresponding characteristic data (e.g., the time the message was sent or the sender's network domain or mobile carrier) from the received message to the filter parameters.

After the comparison has been carried out, the system proceeds to decision block 808, where it determines if the comparison indicated a match between the characteristics of the received message and the filter. In some configurations, if the filter defines multiple characteristics, the system detects a match only if all the characteristics are consistent with the filter. For example, the system may be configured to detect a match only if the message sender and the recipient e-mail account are the same as the characteristics defined in the filter. In an alternate configuration, the filter may include wild cards allowing for multiple matches. For example, the system may detect a match for all e-mail messages originating from a specified Internet domain.

If the system detected a match in block 808, processing proceeds to block 810 where the system processes the match. Processing the match includes adding the message or a reference to the message to a list of detected matches. The list may then be used by the message tracker component 526 (FIG. 5) to determine which messages should be displayed on the mobile device's display. In block 810, the system may also associate status information with the message being processed. For example, the system may store data indicating whether the message has been read. If the message did not match the current filter or after the system has processed the match, processing proceeds to decision block 812, where the system determines if there are additional filters remaining in the filter list. If additional filters remain, the system returns to block 804, where it loads the next filter. If there are no filters remaining, the process exits.

Figure 9:
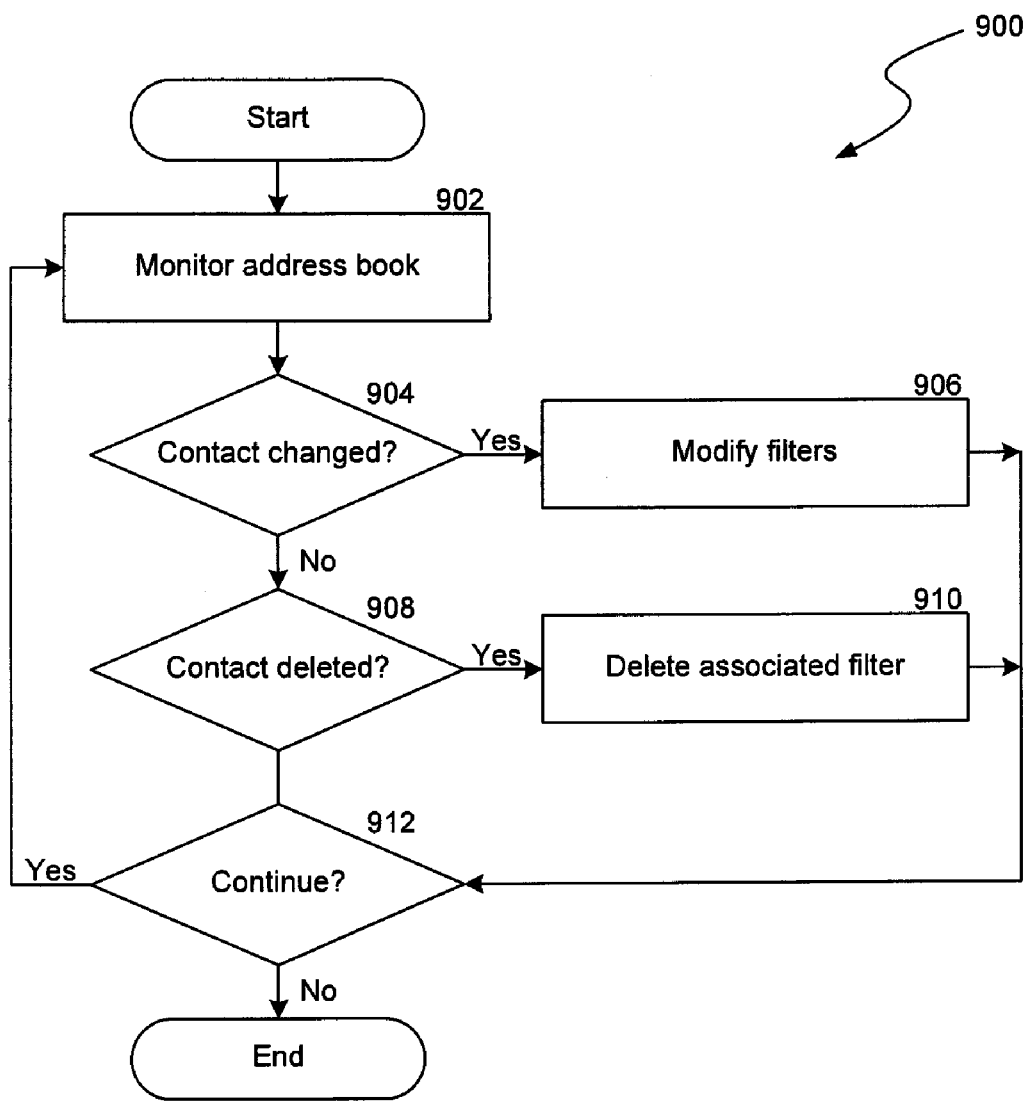
FIG. 9 is a flowchart of a process for monitoring an address book to change the associated filters.

FIG. 9 is a flowchart of a process 900 for monitoring an address book to change the filters associated with it. The process begins in block 902, where the system monitors one or more user address books. In general, the system may be configured to monitor any address book that the user has used to add filters to the system. Thus, the processing in block 902 may include monitoring a local address book on the mobile device or a network address book stored on a network e-mail server. In some configurations, the system periodically polls the address book to compare contact information to the information stored in the individual filters. Alternatively, the address book may be configured to provide a notification to the message filtering system when particular contact information is changed.

The system then proceeds to decision block 904, where it determines if a contact has changed in the address book. If a contact has changed, the system proceeds to block 906, where it modifies the filters associated with that contact. This may include, for example, modifying the address or addresses in the associated filter to conform to the changes made by the user. This saves the user the trouble of reconfiguring the message filtering system to account for changes to a contact. Instead, the user can simply modify the contact in the address book and allow the change to propagate to the message filtering system. If the contact is not changed, the system proceeds to decision block 908, where it determines if a contact has been deleted. If a contact has been deleted, the system proceeds to block 910, where it deletes the associated filter. As discussed above, when a filter is modified or deleted, the system may modify the list of high importance messages to remove messages associated with the modified or deleted filter. This may be performed by re-applying the full set of filters to messages on the device or by removing only the messages that were associated with the previous filter. In either case, the system then controls the mobile device to stop displaying the messages that are no longer high importance.

After the system has modified the filters, deleted filters, or if there are no changes to be made, the system proceeds to decision block 912, where it determines if monitoring should continue. If the system determines that monitoring should continue, it returns to block 902 to continue monitoring. Otherwise, the system exits the process. In some configurations, the process 900 continues to execute while the message filtering system is active. The process 900 may be executed in a separate thread or separate operating system process during execution of the overall system.

The system may also provide a user interface to enable the user to modify or delete individual filters. One skilled in the art will appreciate that the filters can be managed independently, so that changing or removing a selected filter will not have any effect on other filters in the system. In particular, if a particular target sender address was is included in two filters (e.g., by being added based on an address book contact and also by being a sender for a selected message), deleting one of the filters will have no effect on the other filter. As discussed above, if a filter is modified or deleted, the display may be modified to remove messages that are no longer high priority based on the new filter list.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. An apparatus for receiving and managing messages received at a mobile device, the apparatus comprising:
   a display device contained in a housing;
   a memory storing at least one message; and
   a processor coupled among the display device and the memory;
   wherein the processor is configured to execute various components, wherein the components comprise:
      a filter manager component configured to create a messaging filter, wherein the messaging filter includes one or more parameters, and wherein at least one of the one or more parameters is determined based on an address book contact associated with the mobile device;
      a contact monitor component configured to automatically monitor the status of address book contacts subsequent to creating the messaging filter and to update the messaging filter in response to at least one address book contact being modified;
      a filtering component configured to compare characteristic data associated with the stored message to the one or more parameters of the messaging filter, to determine whether the received message is a high importance message based on the comparison, and to determine whether the message is a high importance message based on the updated messaging filter; and
      a message tracker component configured to cause the display device to display a visual indication in response to the message being determined to be a high importance message and to remove the visual indication from the message in response to determining that the message is no longer a high importance message based on the updated messaging filter.

2. The apparatus of claim 1, wherein the components further comprise an account manager component configured to receive data defining one or more messaging accounts used to receive messages at the mobile device.

3. The apparatus of claim 1, further comprising:
   a housing having a form factor suitable for handheld use;
   an input device contained in the housing; and
   at least one wireless network connection component contained in the housing,
   wherein the components further comprise an incoming message component configured to receive a message via the wireless network connection component and store the message in the memory.

4. The apparatus of claim 1, wherein the filter manager component is configured to create a messaging filter based on filter definition data, the filter definition data including one or more parameters determined based on at least a message sender.

5. The apparatus of claim 1, wherein the filtering component is further configured to determine the characteristic data associated with the stored message and wherein the characteristic data includes at least information indicating the identity of the message sender.

6. The apparatus of claim 1, wherein the components further comprise an account manager component configured to receive data defining a messaging account used to receive messages at the mobile device and an incoming message component configured to receive a message through the messaging account.

7. The apparatus of claim 1, wherein the filter definition data includes a destination messaging account.

8. The apparatus of claim 1, further comprising a hardware button configured to receive a user selection, wherein the message tracker component is further configured to cause the display device to display the visual indication in response to the user selection of the hardware button.

9. The apparatus of claim 1, wherein the components further comprise an account manager component configured to receive data defining a first messaging account and a second messaging account, wherein the first messaging account and the second messaging account have different types, and wherein the type of the first messaging account and the type of the second messaging account are one of an e-mail account, a Short Message Service (SMS) account, and a Multimedia Messaging Service (MMS) account.

10. The apparatus of claim 1, wherein the filter definition data comprises a selected message received by the mobile device including data defining at least an address associated with the message sender and the filter manager component generates the messaging filter based on the address associated with the message sender.

11. The apparatus of claim 1, wherein the filter definition data comprises a selected message received by the mobile device including data defining at least an address associated with the message sender and an address associated with a second recipient of the selected message and the filter manager component is configured to generate the messaging filter by:

providing a user interface displaying the address associated with the message sender and the address associated with the second recipient;
receiving data from the input device selecting the address associated with the message sender, the address associated with the second recipient, or both; and
determining target message sender information based on the selected addresses.

12. The apparatus of claim 1, wherein the filtering component is configured to determine that a message is of high importance if a portion of the characteristic data is determined to be identical to a parameter of the one or more parameters in the messaging filter.

13. A method for filtering and managing messages received at a mobile device, the method comprising:
generating a messaging filter, wherein the messaging filter includes one or more parameters, and wherein at least one of the one or more parameters is determined based on an address book contact associated with the mobile device;
automatically monitoring the status of address book contacts subsequent to creating the messaging filter, wherein the messaging filter is updated in response to at least one address book contact being modified;
comparing characteristic data associated with a message to the one or more parameters in the messaging filter, wherein the message is stored on the mobile device;
based on the comparison, determining whether the message is a high importance message; and
displaying a visual indication on a display component associated with the mobile device in response to determining the received message is a high importance message;
based on the monitoring, updating the messaging filter in response to determining that the address book contact has been modified;
determining whether the message is a high importance message based on the updated messaging filter; and
removing the visual indication from the message in response to determining that the message is no longer a high importance message based on the updated messaging filter.

14. The method of claim 13, further comprising retrieving the message from a memory located on the mobile device.

15. The method of claim 13, further comprising storing a listing of messages determined to be high importance messages.

16. The method of claim 13, further comprising receiving filter definition data defining the messaging filter, wherein the received filter definition data includes at least target message sender information.

17. The method of claim 13, wherein comparing characteristic data comprises: determining the characteristic data associated with the message, wherein the characteristic data includes at least information indicating the identity of the message sender.

18. The method of claim 13, further comprising receiving data defining one or more messaging accounts used to receive messages at the mobile device.

19. The method of claim 13, further comprising receiving data defining one or more messaging accounts used to receive messages at the mobile device, wherein the one or more messaging accounts includes at least one of an e-mail account, a Short Message Service (SMS) account, and a Multimedia Messaging Service (MMS) account.

20. The method of claim 13, further comprising receiving filter definition data defining the messaging filter, wherein receiving filter definition data comprises:
receiving a selected contact from an address book associated with the mobile device; and
determining the target message sender information based on address information associated with the selected contact.

21. The method of claim 20, wherein the address book is located on a network address server.

22. The method of claim 13, further comprising receiving filter definition data defining the messaging filter, wherein receiving filter definition data comprises:
receiving a user selection of a target message received by the mobile device as a filter data source, wherein the target message includes data defining at least an address associated with a message sender; and
determining the target message sender information based on the address associated with the message sender.

23. The method of claim 13, further comprising receiving filter definition data defining the messaging filter, wherein receiving filter definition data comprises:
receiving a user selection of a target message received by the mobile device as a filter data source, wherein the target message includes data defining at least an address associated with a message sender and an address associated with a second recipient of the selected message; and
determining the target message sender information based on the address associated with the message sender and the address associated with the second recipient of the selected message.

24. The method of claim 13, further comprising receiving filter definition data defining the messaging filter, wherein receiving filter definition data comprises:
receiving a user selection of a target message received by the mobile device as a filter data source, wherein the target message includes data defining at least an address associated with a message sender and an address associated with a second recipient of the selected message;
providing a user interface displaying the address associated with the message sender and the address associated with the second recipient;
receiving data selecting the address associated with the message sender, the address associated with the second recipient, or both; and
determining the target message sender information based on the selected addresses.

25. The method of claim 13, further comprising receiving filter definition data defining the messaging filter, wherein receiving filter definition data comprises receiving a selected contact from an address book associated with the mobile device and determining the target message sender information based on address information associated with the selected contact and further comprising:
after generating the messaging filter, monitoring the address book associated with the mobile device to detect changes; and
modifying the messaging filter based on changes detected by the monitoring.

26. The method of claim 13, wherein comparing the characteristic data comprises determining if a portion of the characteristic data is identical to a parameter of the one or more parameters in the messaging filter and a message is determined to be of high importance if the portion of the characteristic data is determined to be identical to the parameter.

27. A non-transitory computer-readable storage medium containing instructions for filtering and managing messages received at a mobile device, by a method comprising:
- generating a messaging filter, wherein the messaging filter includes one or more parameters, and wherein at least one of the one or more parameters is determined based on an address book contact associated with the mobile device;
- automatically monitoring the status of address book contacts subsequent to creating the messaging filter, wherein the messaging filter is updated in response to at least one address book contact being modified;
- comparing characteristic data associated with a message to the one or more parameters in the messaging filter, wherein the message is stored on the mobile device;
- based on the comparison, determining whether the message is a high importance message; and
- displaying a visual indication on a display component associated with the mobile device in response to determining the received message is a high importance message;
- based on the monitoring, updating the messaging filter in response to determining that the address book contact has been modified;
- determining whether the message is a high importance message based on the updated messaging filter; and
- removing the visual indication from the message in response to determining that the message is no longer a high importance message based on the updated messaging filter.

28. The non-transitory computer-readable storage medium of claim 27, further comprising receiving data defining one or more messaging accounts used to receive messages at the mobile device.

29. The non-transitory computer-readable storage medium of claim 27, wherein the address book is located on a network address server.

30. The non-transitory computer-readable storage medium of claim 27, further comprising receiving filter definition data defining the messaging filter, wherein the received filter definition data includes at least target message sender information.

31. The non-transitory computer-readable storage medium of claim 21, further comprising receiving filter definition data defining the messaging filter, wherein receiving filter definition data comprises:
- receiving a user selection of a target message received by the mobile device as a filter data source, wherein the target message includes data defining at least an address associated with a message sender and an address associated with a second recipient of the selected message;
- providing a user interface displaying the address associated with the message sender and the address associated with the second recipient;
- receiving data selecting the address associated with the message sender, the address associated with the second recipient, or both; and
- determining the target message sender information based on the selected addresses.

32. The non-transitory computer-readable storage medium of claim 27, further comprising receiving filter definition data defining the messaging filter, wherein receiving filter definition data comprises:
- receiving a user selection of a target message received by the mobile device as a filter data source, wherein the target message includes data defining at least an address associated with a message sender; and
- determining the target message sender information based on the address associated with the message sender.

* * * * *

UNITED STATES PATENT AND TRADEMARK OFFICE
CERTIFICATE OF CORRECTION

PATENT NO. : 8,315,607 B2
APPLICATION NO. : 12/419177
DATED : November 20, 2012
INVENTOR(S) : Ying-Ju Chen et al.

Page 1 of 1

It is certified that error appears in the above-identified patent and that said Letters Patent is hereby corrected as shown below:

In the Claims:

In column 16, line 9, in claim 31, delete "claim 21," and insert -- claim 27, --, therefor.

Signed and Sealed this
Fourteenth Day of May, 2013

Teresa Stanek Rea
*Acting Director of the United States Patent and Trademark Office*